United States Patent
Chun et al.

(10) Patent No.: US 9,394,051 B2
(45) Date of Patent: Jul. 19, 2016

(54) MODULAR POD SYSTEM FOR AIRCRAFT

(71) Applicant: The Boeing Company, Chicago, IL (US)

(72) Inventors: Craig C. M. Chun, Newcastle, WA (US); Lyle E. Picard, Seattle, WA (US); Frank Dugger, Auburn, WA (US); Harold A. Koehler, Chico, CA (US); Paul L. Wynns, San Diego, CA (US); George Hall, Camarillo, CA (US); Glen W. Cunningham, Port Hueneme, CA (US); Arthur Jules Rosenwach, Kirkland, WA (US); Justin Kearns, Seattle, WA (US)

(73) Assignee: The Boeing Company, Chicago, IL (US)

(*) Notice: Subject to any disclaimer, the term of this patent is extended or adjusted under 35 U.S.C. 154(b) by 198 days.

(21) Appl. No.: 13/926,953

(22) Filed: Jun. 25, 2013

(65) Prior Publication Data
US 2015/0298807 A1   Oct. 22, 2015

(51) Int. Cl.
*B64D 47/00*  (2006.01)
*B64D 7/00*  (2006.01)
*B64C 7/00*  (2006.01)
*B64D 9/00*  (2006.01)
*H01Q 1/28*  (2006.01)

(52) U.S. Cl.
CPC ... *B64D 7/00* (2013.01); *B64C 7/00* (2013.01); *B64D 9/00* (2013.01); *B64D 47/00* (2013.01); *H01Q 1/28* (2013.01)

(58) Field of Classification Search
CPC ............ B64C 2211/00; B64D 7/00; B64D 2013/0614
USPC .................................................. 244/121
See application file for complete search history.

(56) References Cited

U.S. PATENT DOCUMENTS

| | | | | |
|---|---|---|---|---|
| 4,674,704 A | * | 6/1987 | Altoz et al. | 244/1 R |
| 4,869,071 A | * | 9/1989 | Wehner et al. | 62/133 |
| 5,282,589 A | | 2/1994 | Branigan et al. | |
| 6,745,981 B1 | * | 6/2004 | Rainer et al. | 244/118.1 |
| 6,929,214 B2 | * | 8/2005 | Ackleson | G01S 7/495 244/1 R |
| 2007/0205327 A1 | * | 9/2007 | Gioffre et al. | 244/118.1 |
| 2009/0014583 A1 | * | 1/2009 | Shelton | 244/118.2 |
| 2012/0160957 A1 | * | 6/2012 | Gagne et al. | 244/54 |

FOREIGN PATENT DOCUMENTS

| | | | |
|---|---|---|---|
| GB | 2338694 | 12/1999 | |
| GB | 2338694 A | * 12/1999 | B64D 47/00 |
| WO | 2005032938 | 4/2005 | |

OTHER PUBLICATIONS

Extended European Search Report, Patent Application No. 14173940.9 dated Nov. 24, 2014.

* cited by examiner

*Primary Examiner* — Tien Dinh
*Assistant Examiner* — Aaron Rodziwicz
(74) *Attorney, Agent, or Firm* — Kunzler Law Group, PC

(57) ABSTRACT

A mission pod system for an aircraft set to perform a mission includes a fixed portion that is fixedly secured to an exterior surface of the aircraft. The mission pod system also includes a modular portion that is removably secured to the fixed portion and spaced away from the exterior surface of the aircraft via the fixed portion. The modular portion includes an entirety of mission-specific components.

21 Claims, 10 Drawing Sheets

MODULAR POD SYSTEM FOR AIRCRAFT

FIELD

This disclosure relates to aircraft, and more particularly to mission-specific pods secured to an aircraft.

BACKGROUND

Conventional aircraft, particularly military aircraft, may be equipped with mission-specific pods secured to an external surface of the aircraft. Mission-specific pods house various components or payload that facilitate the execution of various operations associated with a mission. For example, a mission-specific pod can include electronic components, such as antenna, that facilitate incoming and outgoing communications between the aircraft and any of various other objects. A mission-specific pod may also, or alternatively, include electronic components, such as radar and sensors, that facilitate surveillance operations.

Because different missions often require different operations, they also demand pods with different components to accommodate such divergent operations. Moreover, a single aircraft may be used to fulfill different missions. Accordingly, one aircraft may require complete removal of one pod associated with certain operations and attachment of another pod associated with certain other operations. The removal and attachment of traditional pods requires a complete removal of the entire pod from the aircraft, and a complete attachment of the entire pod to the aircraft. This removal and attachment constraint places practical limits on the size, shape, and modularity of traditional pod designs. Traditional pods utilize a standard mechanical and electrical interface with the aircraft, which also limits their flexibility and adaptability to diverse mission sets. Generally, customized pod interfaces have found limited use in the past at least partially because the processes for complete removal and attachment of customized pods are complicated, time-consuming, and costly. Further, many customized pods require extensive modifications to the host aircraft to accommodate customized interfaces. For example, the couplings that secure the pod to the aircraft may not be easily accessible during normal operations if customized interfaces are used to accommodate a larger pod capable of carrying a wider variety of pod mission systems. Overall, traditional pod designs face a tradeoff where they must contend with limited size and utility in order to obtain the ease of integration associated with standardized aircraft interfaces. Similarly, traditional pod designs face installation complexity and expensive aircraft modifications in order to obtain the flexibility and utility associated with customized interfaces.

Commonly, the internal components of a pod may need to be accessible while the pod is attached to the aircraft for testing, maintenance, or repair of the components. A pod may include side access ports through which an operator may access the components. Additionally, the components may be mounted to a panel that is removable from the pod for providing access to the components. Often, the panel containing the components is slid laterally or longitudinally out from the pod. Such lateral or longitudinal movement can be obstructed by other structures of the aircraft, such as landing gear and fairings.

Although some testing of the components of traditional pods can be performed through access ports while the components are installed within the pod, or by removing a component panel from the pod, such testing is limited. For example, only limited access to some components is allowed through the access ports. Accordingly, testing of only some of the components is feasible through the access ports. Even though removal of the component panel from the pod allows additional access to more components, because the component panel has been physically and electrically separated from the pod, testing of the entire pod, including the internal components and external components, such as sensors, radar, antenna, etc., is not feasible.

Requirements for maintenance access and removal of pod components, coupled with the complexities of surrounding aircraft components, dictate that traditional pods must be completely removed from the host aircraft in order to undergo significant testing, maintenance, or troubleshooting. Removal, transport, and storage of traditional pods require support equipment such as carts, hoists, and racks. Because a traditional pod must be completely removed from the host aircraft and then transported on support equipment, practical limits are placed on the size, shape, and weight of traditional pod designs.

SUMMARY

The subject matter of the present application has been developed in response to the present state of the art, and in particular, in response to the problems and needs of mission pods for aircraft that have not yet been fully solved by currently available systems. Accordingly, the subject matter of the present application has been developed to provide a modular pod system for an aircraft, which overcomes at least some of the above-discussed shortcomings of prior art pods and techniques.

According to one embodiment, a mission pod system for an aircraft set to perform a mission includes a fixed portion that is fixedly secured to an exterior surface of the aircraft. The mission pod system also includes a modular portion that is removably secured to the fixed portion and spaced away from the exterior surface of the aircraft via the fixed portion. The modular portion includes an entirety of mission-specific components.

In some implementations of the mission pod system, the fixed portion includes a sidewall that extends substantially transversely away from the exterior surface of the aircraft. The sidewall defines an interior cavity with an open end that extends substantially parallel to the exterior surface of the aircraft to which the fixed portion is fixedly secured. The modular portion can include a board that is removably secured to the sidewall of the fixed portion at the open end, where the board covers the open end. The board can further include an upper surface that faces the aircraft and an opposing surface that faces away from the aircraft. At least a portion of the mission-specific components can be mounted on the upper surface of the board. When the board is removably secured to the sidewall of the fixed portion, the portion of the mission-specific components mounted on the upper surface of the board are positioned within the interior cavity of the fixed portion. The portion of the entirety of components necessary for performing the mission mounted on the upper surface of the board can include computer processors for executing functionality of the mission. In some implementations, at least a portion of a lower surface of the board is transparent.

According to certain implementations of the mission pod system, a portion of the entirety of component necessary for performing the mission are mounted on the lower surface. When the board is removably secured to the sidewall of the fixed portion, the portion of the entirety of components necessary for performing the mission mounted on the lower surface of the board extends away from the interior cavity of the fixed portion. The portion of the entirety of components necessary for performing the mission mounted on the lower surface of the board comprises at least one of blade antenna, dish antenna, phased array antenna, optical sensors, or data transceivers.

In some implementations of the mission pod system, the board includes an upper surface facing the aircraft and an opposing surface facing away from the aircraft. At least a portion of the entirety of components necessary for performing the mission is mounted on the upper surface of the board. When the board is removably secured to the sidewall of the fixed portion, some of the portion of the entirety of components necessary for performing the mission mounted on the upper surface of the board are positioned within the interior cavity of the fixed portion and the other of the portion of the entirety of components necessary for performing the mission mounted on the upper surface of the board are positioned external to the interior cavity of the fixed portion.

According to certain implementations of the mission pod system, the modular portion includes a board that is removably secured to the fixed portion. The board includes a first data communication interface. The fixed portion includes a second data communication interface that is engageable with the first data communication interface to receive data from the entirety of components necessary for performing the mission. The fixed portion further includes a third data communication interface in data receiving communication with the second data communication interface. The third data communication interface is in data providing communication with the aircraft.

In some implementations of the mission pod system, the modular portion is removably secured to the fixed portion via a plurality of fasteners accessible from a location external to the aircraft. The modular portion can include an elongate board that has a length greater than the fixed portion, a width greater than the fixed portion, and a thickness that is different (e.g., less) than the fixed portion. The modular portion may include an elongate board that has a substantially flat upper surface and a substantially flat lower surface.

According to some implementations, the mission pod system includes a component cooling system that is positioned within the fixed portion. The component cooling system comprising an air inlet formed in the fixed portion and an air outlet formed in the fixed portion, wherein the component cooling system cools at least some of the entirety of mission-specific components of the modular portion. The mission pod system can also include a plurality of modular portions interchangeably and removably securable to the fixed portion, where each of the plurality of modular portions includes an entirety of mission-specific components for a respective one of a plurality of different missions. The fixed portion can include two power inputs in power receiving communication with two separate power source outputs of the aircraft. The modular portion can be removably secured to the fixed portion from below the fixed portion.

According to another embodiment, an aircraft includes a body that defines an exterior surface and a base pod that is fixedly secured to the exterior surface of the body. The aircraft also includes a mission pod that is removably secured to the base pod. The mission pod includes an entirety of components specific to a mission. In some implementations, the base pod can separate, such as spatially separate, the mission pod from the body. Further, the mission pod can include a thin board with substantially flat upper and lower surfaces, where the thin board is external to the body and base pod. In certain implementations, the body includes external trunnions, and the base pod is fixedly secured to the trunnions of the body.

In yet another embodiment, a method for fitting an aircraft for a mission includes fixedly attaching a base pod to an external surface of the aircraft. The method also includes selecting a first mission from a plurality of missions and removably coupling a first mission pod of a plurality of mission pods each associated with a different mission. The first mission pod is associated with the first mission. The method also includes selecting a second mission from the plurality of missions, decoupling the first mission pod from the base pod, and removably coupling a second mission pod of the plurality of mission pods associated with the second mission.

In some implementations, the method may include a component cooling system that is configured to cool at least one of a plurality of components disposed within at least one of the first mission pod, second mission pod, and base pod. Cooling the components of the first and second mission pods can be conducted separately depending on which is coupled to the base pod. For example, as described above, a component cooling system of the base pod may transfer heat away from the internal mission components of the mission pods. According to certain implementations, the method may include interchangeably coupling the first and second mission pods to the base pod, where the first mission pod includes an entirety of mission-specific components for the first mission and the second mission pod includes an entirety of mission-specific components for the second mission. The first mission pod can be removably coupled to the base pod from below the base pod, and the second mission pod can be removably coupled to the base pod from below the base pod.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
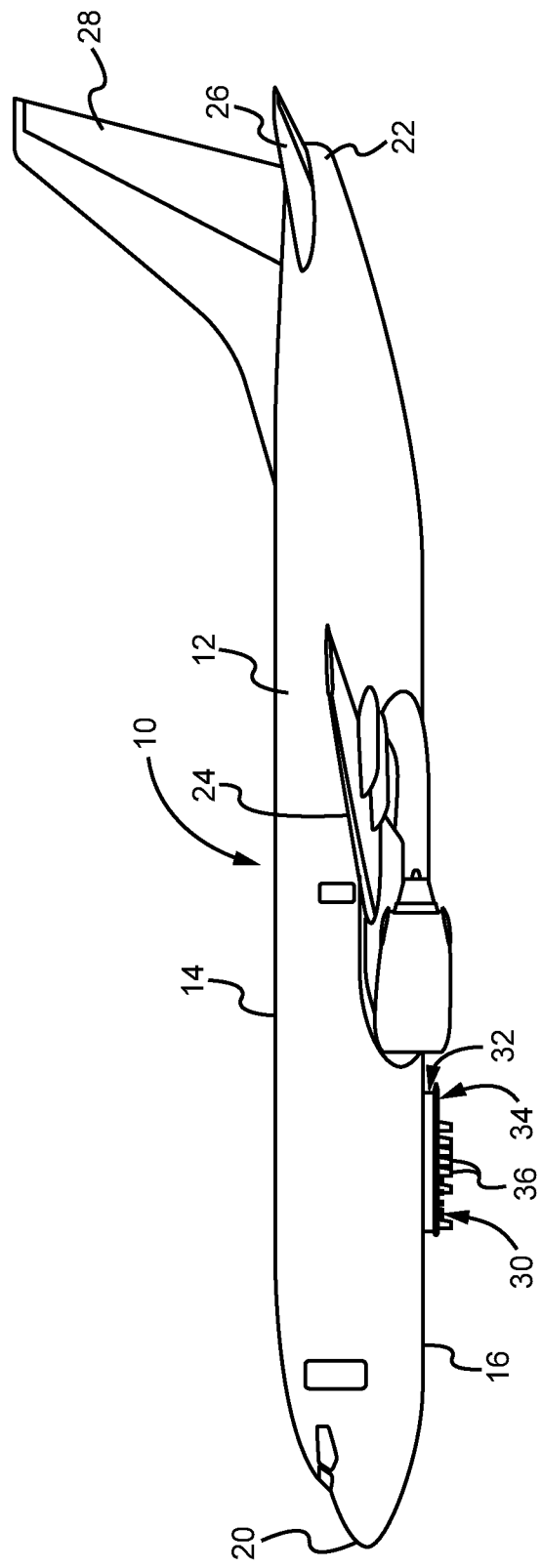
FIG. 1 is a side view of an aircraft with a modular pod system according to one embodiment.
Figure 2:
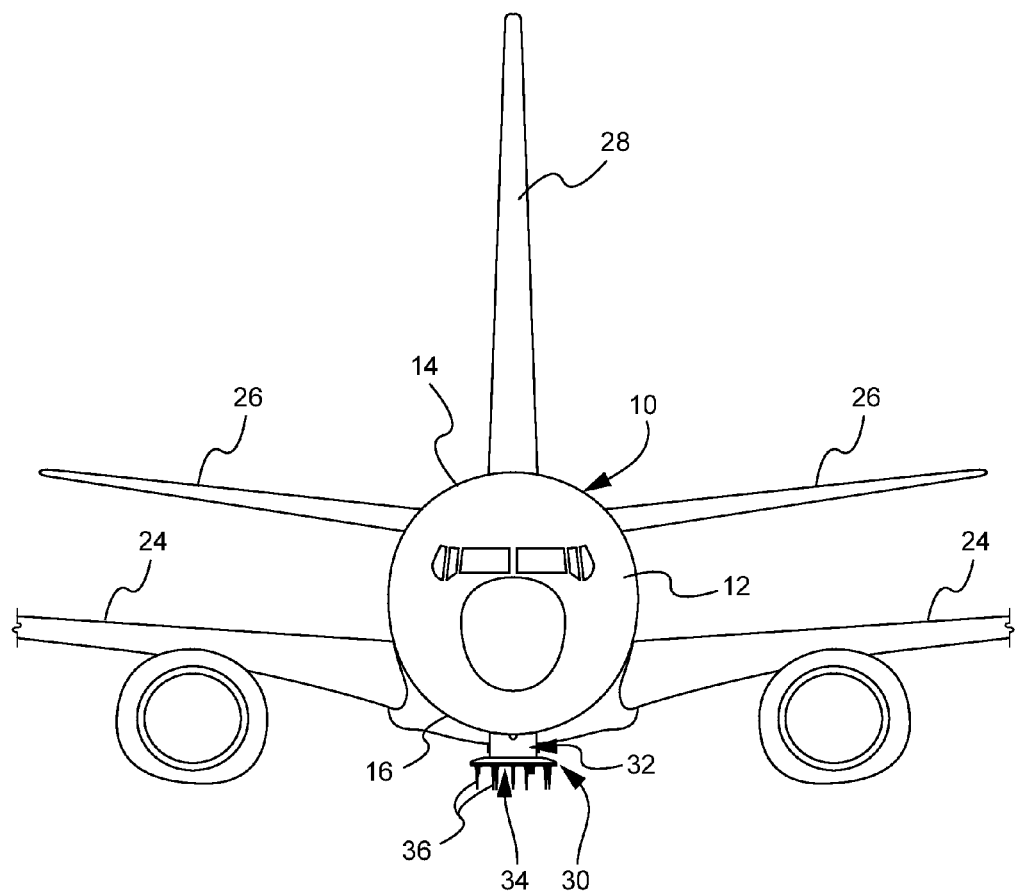
FIG. 2 is a front view of an aircraft with a modular pod system according to one embodiment.

Referring to FIGS. 1 and 2, one embodiment of an aircraft 10 (e.g., host aircraft) is shown. The aircraft 10 can be any of various commercial aircraft used for the transportation of passengers, or military aircraft used for tactical exercises and operations, or general unmanned aircraft used for a plurality of commercial or military operations. The aircraft 10 includes a fuselage or body 12. The body 12 defines an upper surface 14 and a lower surface 16 opposing the upper surface. Further, the body 12 extends from a front portion 20 to a rear portion 22. Intermediate the front portion 20 and rear portion 22, the aircraft 10 includes a pair of wings 24, which in the illustrated embodiment, includes corresponding propulsion engines coupled to the wings. Proximate the rear portion 22, the aircraft 10 includes a pair of horizontal stabilizers 26 and a vertical stabilizer 28.

Attached to the lower surface 16 of the aircraft body 12 between the wings 24 and the front portion 20 is a pod system 30. The pod system 30 includes a fixed portion 32 fixedly secured to the body 12 and a modular portion 34 removably secured to the fixed portion 32. The fixed portion 32 is configured to be substantially permanently secured to the body 12 regardless of the mission to be performed by the aircraft 10. In contrast, the modular portion 34 is configured to be relatively easily coupled to and removed from the fixed portion 32 depending on the mission to be performed by the aircraft 10. In this manner, the fixed portion 32 can be defined as a base pod or universal pod, and the modular portion 34 can be defined as a mission pod. Although not shown in FIGS. 1 and 2, the modular portion 34 includes at least one internal mission-specific component mounted thereon that is positioned within the fixed portion 32 when the modular portion is removably secured to the fixed portion, as will be described in more detail below. In some implementations, the modular portion 34 also includes at least one external mission-specific component mounted thereon that is positioned external to the fixed portion 32, and the body 12 of the aircraft 10, when the modular portion is removably secured to the fixed portion. In the present embodiment, the external mission-specific components include a plurality of blade antennae 36 for general radio-frequency (RF) collection and/or general communication missions.

Although located on the lower surface 16 of the aircraft body 12 between the wings 24 and the front portion 20 in the illustrated embodiment, the pod system 30 can be positioned at other locations on the lower surface 16 in other embodiments. Moreover, in yet some embodiments, the pod system 30 can be positioned on other portions of the aircraft body 12 and in other orientations, such as a side surface or the upper surface 14 if desired, and any of various locations along the body. However, for missions requiring ground communication and ground surveillance, positioning the pod system 30 on the lower surface 16 of the body 12 reduces interference and obstruction from the various components of the aircraft during such operations. Additionally, the fixed portion 32 acts as a stand-off to maintain the modular portion 34 in a spatially isolated, separate, or spaced-apart relationship with the body 12. For example, as shown in FIG. 2, the fixed portion 32 positions the modular portion 34 a distance away from the body 12. The distance can be substantially equal to a height of the fixed portion 32. Such isolation, separation, or spacing may be beneficial depending on the particular mission or entirety of components disposed within a particular pod. Positioning the modular portion 34 and its mission-specific components away from the body 12 also limits interference and obstruction from the components of the aircraft during communication and surveillance operations, among other operations. For example, as shown in FIG. 2, the blade antennae 36 are positioned well beneath the bottom surface 16 of the body 12 due to the height of the fixed portion 32 or base pod.

Figure 3:
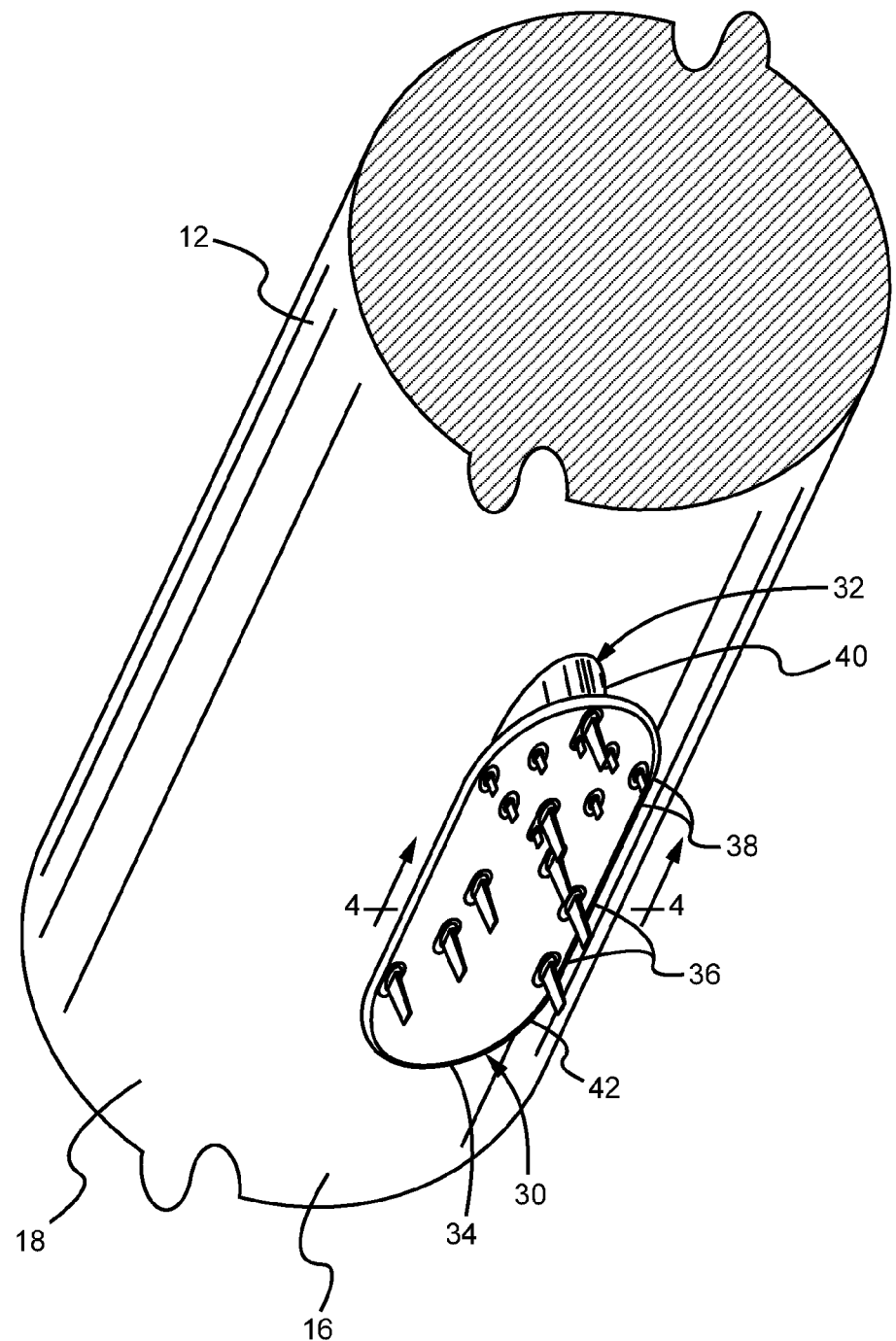
FIG. 3 is an upward perspective view of a modular pod system coupled to an aircraft according to one embodiment.
Figure 4:
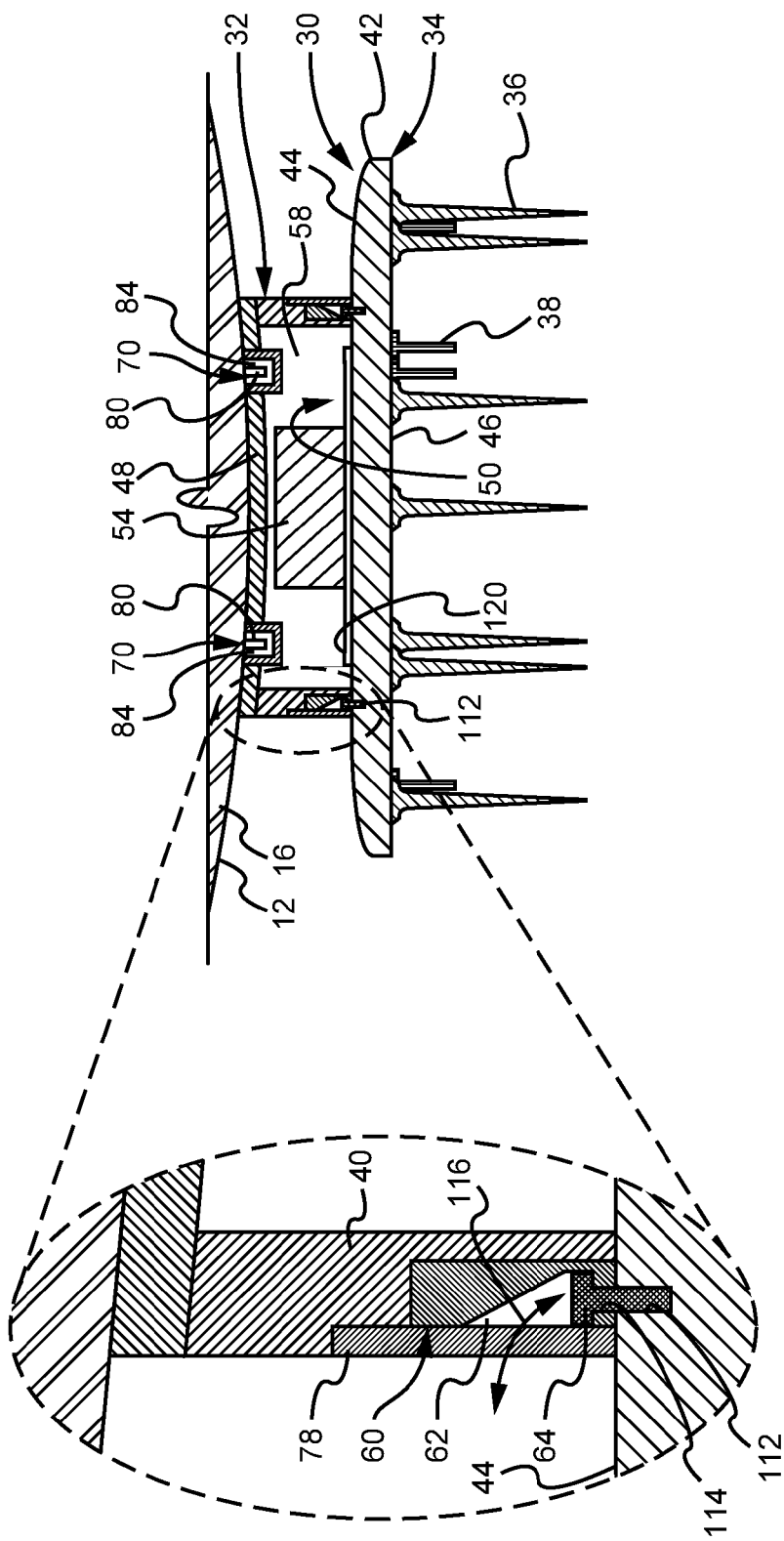
FIG. 4 is a cross-sectional front view of the modular pod system of FIG. 3 taken along the line 4-4 of FIG. 3.
Figure 5:
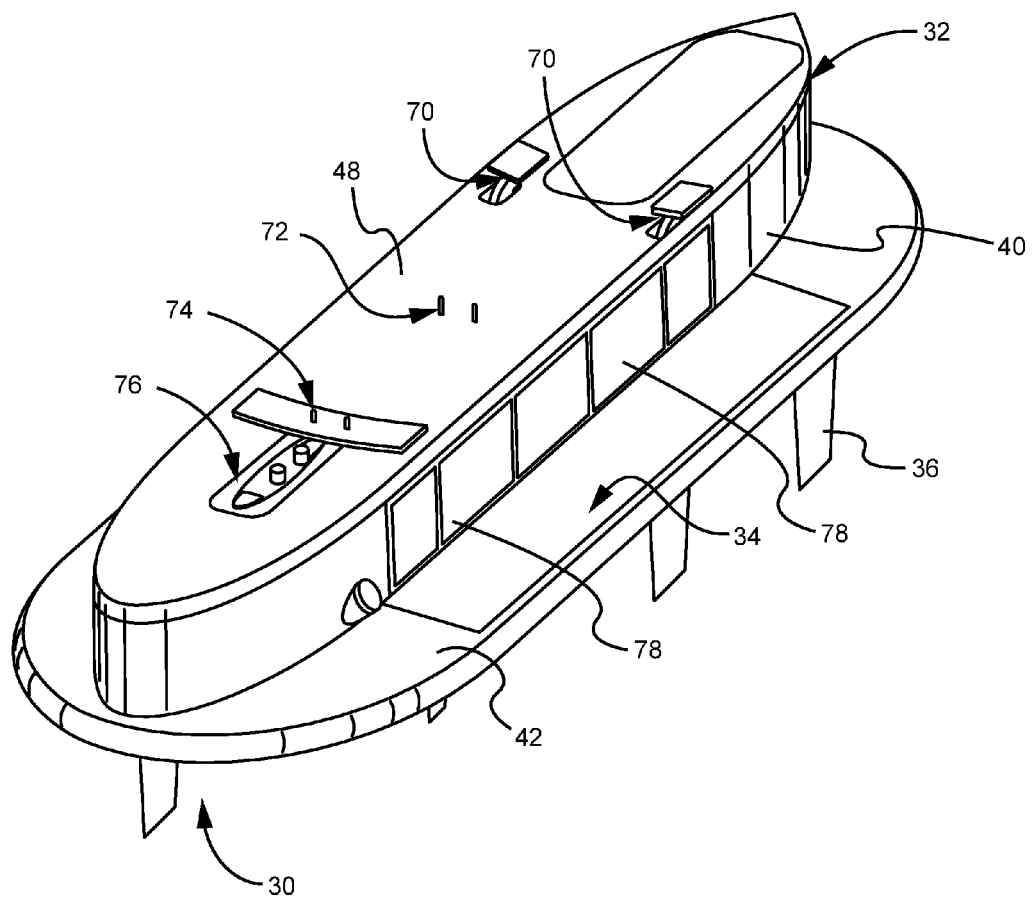
FIG. 5 is a downward perspective view of a modular pod system according to one embodiment.

As shown in FIGS. 3-5, the fixed portion 32 includes a side panel 40 defining an elongate-shaped outer periphery of the fixed portion. Although the outer periphery of the fixed portion 32 can have any of various shapes, in the illustrated embodiment, the outer periphery of the fixed portion has, and the side panel 40 forms, an elongate ovular shape. The fixed portion 32 also includes a top panel 48 secured to an upper portion of the side panel 40 such that an upper end of the fixed portion 32 is substantially closed. The lower end of the fixed portion 32 opposing the closed end is open. Defined between the side panel 40, top panel 48, and open end of the fixed portion 32 is an interior cavity 58 of the fixed portion. Access to the interior cavity 58 can be gained via the open end of the fixed portion 32 or through a plurality of access ports formed in the side panel 40 and covered by a plurality of covers 78. The covers 78 are movably coupled to the side panel 40 over the access ports, and can be moved (e.g., rotated, slid, etc.) to allow access to the interior cavity 58 through the ports.

As described above, the fixed portion 32 is fixedly secured to an exterior surface 18 of the body 12 of the aircraft 10 (which is an exterior surface 18 of the bottom surface 16 of the body 12 in the illustrated embodiment). In some embodiments, the fixed portion 32 is secured to the body 12 in such a way that removal of the fixed portion 32 from the body 12 can require extensive effort, such as requiring access to the fixed portion 32 from within the body of the aircraft. Due to the additional labor and limited accessibility associated with removal of the fixed portion 32, the fixed portion can remain permanently or semi-permanently attached to the body 12 across multiple divergent missions. However, as shown in FIG. 5, in the illustrated embodiment, the fixed portion 32 includes attachment mechanisms 70, 72, 74 formed in or coupled to the top panel 48 of the fixed portion 32, which allow permanent or semi-permanent attachment of the fixed portion 32 to the body 12 without the need to access the interior of the body 12. For example, the open access to the interior cavity 58 of the fixed portion 32 facilitates the attachment of the fixed portion to the body by allowing access to the attachment mechanisms through the interior cavity if desired. Further, the modular detachability or removability of the modular portion 34 allows the fixed portion 32 to remain permanently or semi-permanently attached to the body 12 across multiple divergent missions requiring multiple modular portions.

The attachment mechanisms 70 include a trunnion interface configured to receive and retain a respective external aircraft trunnion 80 extending from the body 12 of the aircraft 10 (see, e.g., FIG. 4). In one embodiment, each attachment mechanism 70 includes a bracket mounted to an underside of the top panel 48. Coupled to the bracket are two spaced-apart tabs that are accessible to the aircraft trunnions 80 via an aperture formed in the top panel 48. The aircraft trunnions 80 are positioned between a respective pair of fixed portion tabs 84 such that apertures formed in the trunnion 80 and tabs 84 are aligned. A pin can be inserted through the aligned apertures of the trunnion and tabs to secure the trunnion and tabs together, and to fixedly secure the fixed portion 32 to the body 12 via the bracket. In some implementations, the tabs 84 include an alignment feature with an aperture. The tabs 84 can be first secured to a trunnion with the pin, with the alignment feature of the tabs extending through a respective aperture of the attachment mechanism 70 formed in the top panel 48 to align the fixed portion 32 with the body 12. Once received and extending through the aperture in the top panel 48, an additional pin can be extended through the alignment feature and the bracket to secure the tabs and bracket together, which correspondingly secures the fixed portion 32 to the body 12. In certain implementations, the bracket is actuatable to adjust the longitudinal and/or lateral position of the fixed portion 32 relative to the body 12 to precisely control the position of the fixed portion on the body.

The attachment mechanisms 72, 74 can be respective fastener pairs or receptacle pairs. In the implementation shown in FIG. 5, the mechanisms 72, 74 each include a pair of fasteners that engage receptacles or openings in the body 12 of the aircraft 10. Alternatively, in the implementation shown in FIG. 6, the mechanisms 72, 74 each include a pair of receptacles or openings that receive fasteners originating from within the body 12 of the aircraft 10. In either implementation, attachment of the fixed portion 32 to the body 12 via the mechanisms 72, 74 may require access to an interior of the aircraft 10 or body of the aircraft, or the internal cavity 58 of the fixed portion 32.

Figure 7:
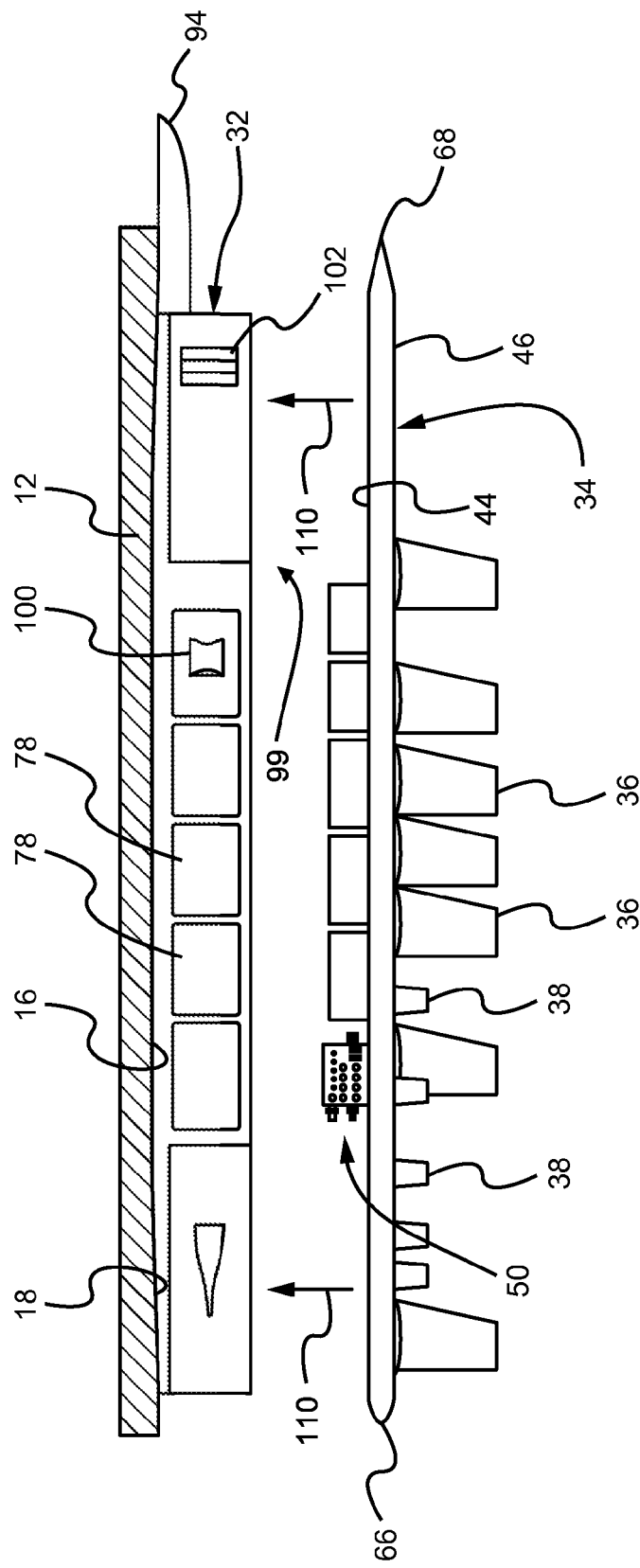
FIG. 7 is a side view of a modular pod system shown with a fixed portion separated from a modular portion according to one embodiment.

As shown in FIG. 7, the fixed portion 32 is mounted substantially flush against the exterior surface 18 of the body 12 of the aircraft 10. Because the exterior surface 18 may be a curved surface, an upper end of the fixed portion 32, including all or portions of the top panel 48, may also be correspondingly curved to facilitate a flush mounting of the fixed portion against the exterior surface of the body. However, as shown in FIG. 2, the lower end of the fixed portion 32 can be substantially flat or co-planar with the modular portion to facilitate a flush mounting of the modular portion 34 to the fixed portion.

The modular portion 34 includes a substantially flat board 42 with a plurality of components mounted to (e.g., on or in) the board. The board 42 extends longitudinally from a front end 66 to a rear end 68 (see, e.g., FIGS. 6 and 7). The front and rear ends 66, 68 may define a substantially curved or arcuate edge, such that a plan view (e.g., from above or below), the front and rear ends have a substantially semi-circular or semi-ovular shape. The front and rear ends 66, 68 are coupled together via elongate sides 86 extending between the front and rear ends. The opposing sides 86 of the board 42 can extend substantially parallel to each other along the length of the sides. A width of the board 42 is defined as the distance between the opposing sides 86. Additionally, the board 42 has a relatively small thickness extending between opposing upper and lower surfaces 44, 46 compared to the length and width of the board. The upper and lower surfaces 44, 46 are substantially flat and extend substantially parallel to each other in the illustrated embodiment. In this manner, in certain implementations, the board 42 can be described as having a substantially surfboard shape.

In the illustrated embodiment, the board 42 has a larger footprint than the fixed portion 32, and more specifically, the outer periphery of the fixed portion defined by the side panel 40. In other words, the length and width of the board 42 are longer and wider than the length and width of the fixed portion 32. However, in some instances, the length of the board 42 can be just larger than or substantially equal to the length of the fixed portion 32. In certain implementations, the board 42 is between approximately 0% and approximately 30% longer than the fixed portion 32. In yet certain implementations, the board 42 is between approximately 10% and approximately 50% wider than the fixed portion 32. The wider nature of the board 42 is particularly useful for providing a larger area on which mission components may be mounted. For example, the larger surface area provided by the wider board 42 facilitates the mounting of additional mission components to the board or an increase in the spacing between mission components mounted to the board, that would otherwise not be allowed with narrower pods associated with conventional techniques. For example, in the illustrated embodiment of FIG. 2, the blade antennae 36 are positioned well outside of the periphery of the fixed portion 32 defined by the side panel 40.

The board 42 includes an internal frame 88 that includes a plurality of beams that promote the structural integrity of the board. An outer shell is applied onto or over the internal frame 88. The beams of the internal frame 88 and outer shell, as well as other components of the pod system 30, can be made from any of various materials, such as aluminum, steel, or composite material. Mounted onto the board 42, and more specifically, in some implementations, secured to the beams of the internal frame 88, is a plurality of component tracks 120. In the illustrated implementation, the tracks 120 extend in a lateral direction along a width of the board 42. The internal mission components 50 of the pod system 30 are mounted to the tracks 120 via a plurality of motion dampener mounts 122 or vibration isolators. The mounts 122 are attached to the components at a first interface of the mounts, and attached to the tracks 120 at a second interface of the mounts. The motion dampener mounts 122 each includes a motion dampener or motion dampening material to reduce vibrational effects on the components 50. Additionally, the motion dampener mounts 122 are movable translationally along the tracks 120 as indicated by directional arrows 124 to provide adjustability of the position of the components 50 on the board 42 and the position of the components relative to other components. Because the tracks 120 are effectively mounted on the upper surface 44 of the board 42, the internal mission components 50 also are considered to be mounted on the upper surface of the board. Although not shown, in certain implementations, each of the components 50 can be secured to a respective mounting tray, with the mounting tray being secured to the motion dampener mounts 122. In this manner, the installation and removal of the internal mission components 50 can be easier, adaptable, and modular.

The components 50 are considered internal mission components because each of the components 50 is positioned within the fixed portion 32 when the modular portion 34 is removably secured to the fixed portion, and each of the components 50 is configured to perform operations specific to a particular mission. In the illustrated embodiment, the internal mission components 50 include a plurality of electronic boxes 54A-E. Each of the boxes 54A-E is configured to perform functions directly related to fulfilling the objectives of the mission, such as, for example, receiving data from external mission components, RF distribution, low noise amplification, RF receiver tuning, data digitization, processing data, and/or outputting data to the aircraft 10 via the fixed portion 32 or to other objects via the external mission components. One or more of the boxes 54A-E are electrically coupled to each other or the support component 56. The components 50 also include the support component 56, which may include a plurality of sub-components, that provides supporting infrastructure functionality for the mission components of the modular portion 34. Infrastructure functionality may include power conditioning, discrete switching, component commanding, component health monitoring, and component controlling. The support component 56 may be a mission-specific component uniquely configured to perform infrastructure functionality associated with a particular mission. Alternatively, the support component 56 may be a universal component configured to perform infrastructure functionality for a plurality of mission-specific components each associated with one of a plurality of missions.

In one implementation, the tracks 120 and internal mission components 50 are positioned at an approximate middle or center of the upper surface 44 (e.g., approximately midway between the front and rear ends 66, 68 of the board 42, and approximately midway between the sides 86 of the board). Additionally, a plurality of fastener apertures 112 or receptacles are formed in the upper surface 44 of the board 42 about the electronic components 50. The apertures 112 are alignable with corresponding apertures formed in the side panel 40 of the fixed portion 32. As will be described in more detail below, fasteners can be extended through the aligned apertures to removably secure the modular portion 34 to the fixed portion 32.

Figure 6:
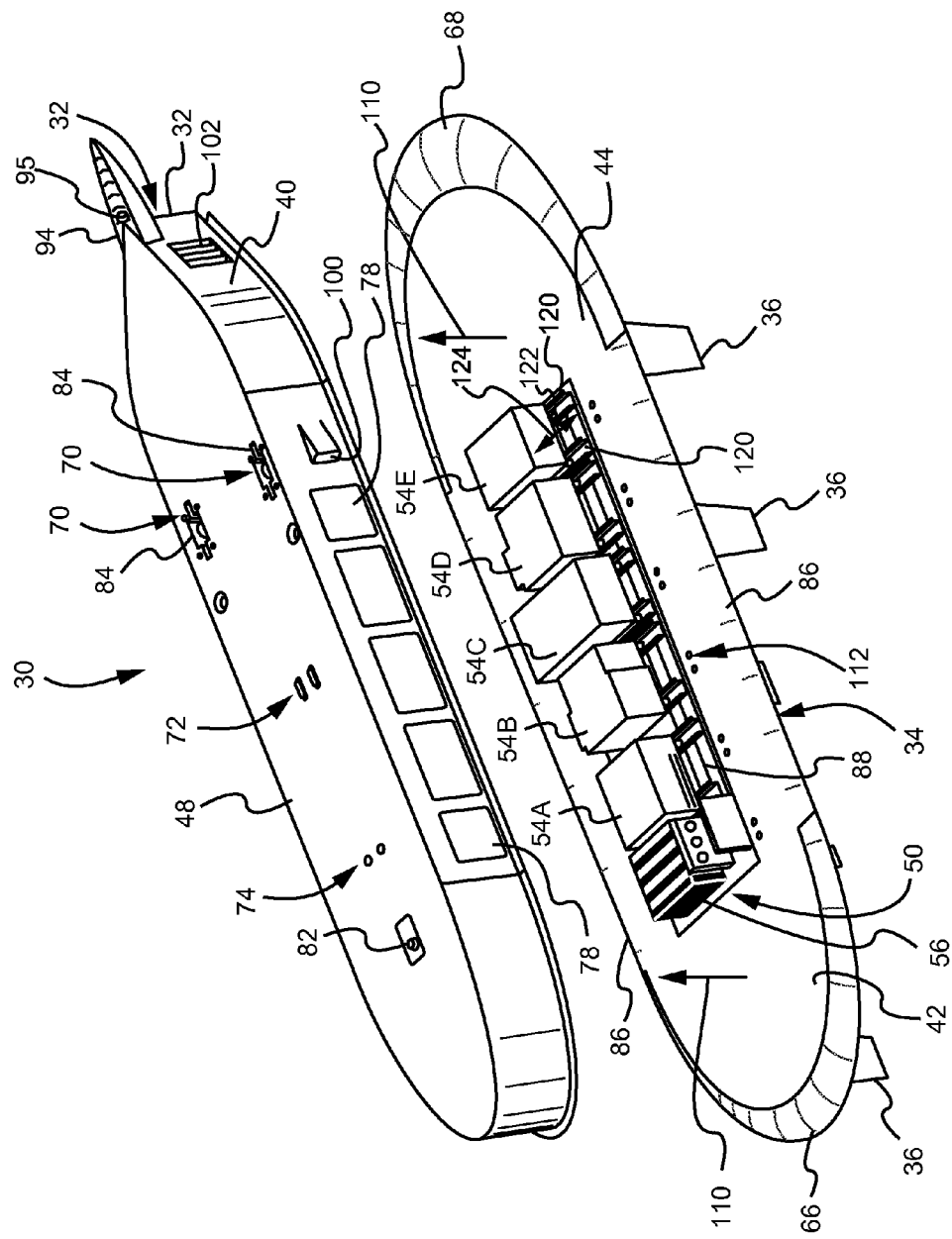
FIG. 6 is a downward perspective view of the modular pod system of FIG. 5 shown with a fixed portion separated from a modular portion according to one embodiment.

The fixed portion 32 may include a component cooling system 99 with air ducting within the interior cavity 58 that can form part of an environment control system also positioned within the interior cavity. The component cooling system 99 of the environment control system includes a heat transfer device that transfers heat away from or to the internal mission components 50 to air flowing through the air ducting. As shown in FIGS. 6 and 7, the air ducting includes a pair of air inlets 100 formed in opposing sides of the side panel 40, and a pair of air outlets 102 also formed in opposing sides of the side panel 40. Ambient air is captured by the air inlets 100, heated as the air is directed through the ducting, and expunged through the air outlets 102. The component cooling system 99 of the environmental control system is closed. Accordingly, the internal mission components 50 are isolated from external foreign objects, such as salt water or external debris.

Figure 8:
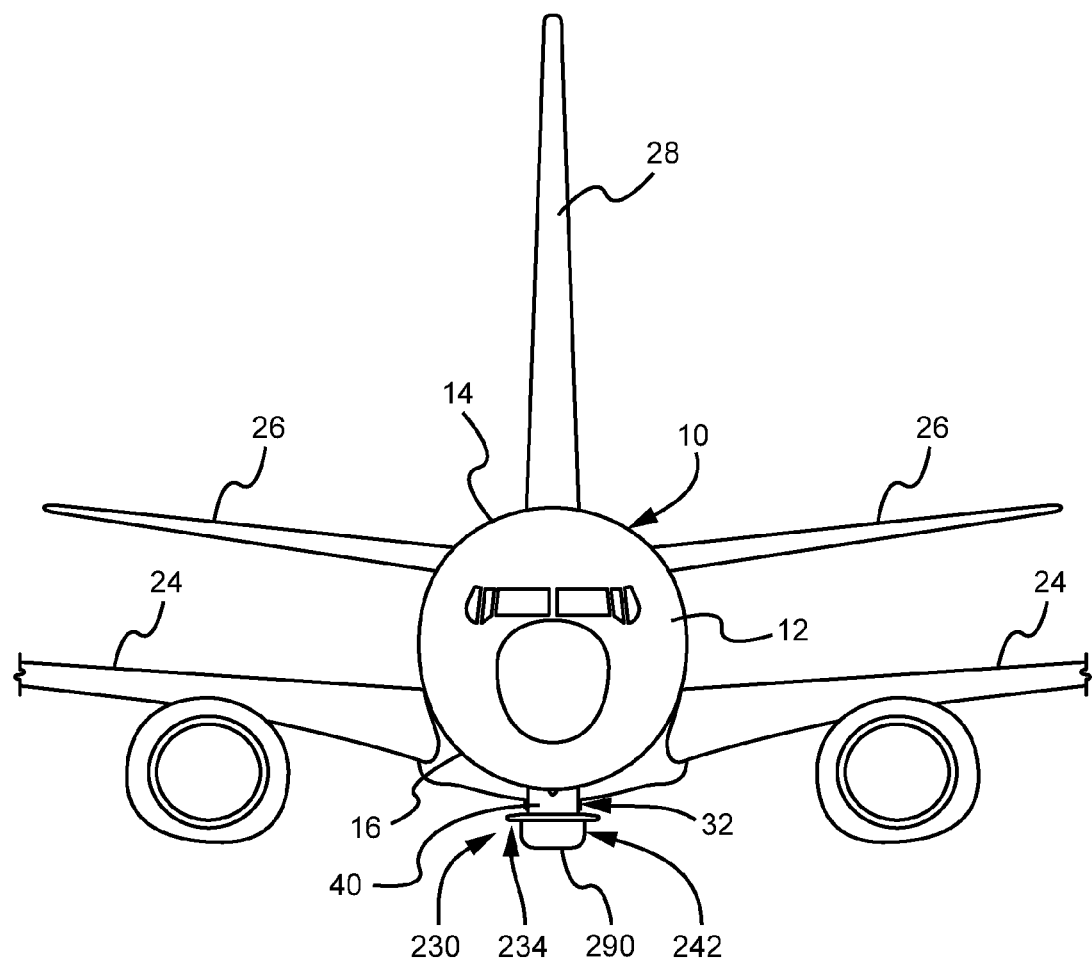
FIG. 8 is a front view of an aircraft with a modular pod system according to another embodiment.

The modular portion 34 also include one or more external mission components mounted to the upper surface 44 of the board 42 and/or the lower surface 46 of the board. The external mission components are configured to perform operations specific to a particular mission. In the illustrated embodiments of FIGS. 1-7, the external mission components include blade antennae 36, 38 mounted on and extending from the lower surface 46 of the board 42. The blade antennae 36, 38 are configured to receive RF signals and/or provide general communication functionality. Accordingly, the internal mission components 50 of the modular portion 34 of the illustrated embodiments of FIGS. 1-7 are configured to perform functions directly related to the receipt of RF signals, optical signals, and/or general communication functionality. Referring to FIG. 8, in other embodiments, the external mission component may be a dish antenna 290 mounted on and extending from the lower surface of the board 242. Accordingly, the internal mission components of the modular portion 234 of the pod system 230 are configured to perform functions directly related to dish antenna functionality. Alternatively, at least a portion of the lower surface of the board 242 may be transparent and formed of optical quality materials permitting use of a video or still camera as a part of the instrument package. Direct line-of-site communication via optical means may also be accomplished through the transparent portion.

Figure 9:
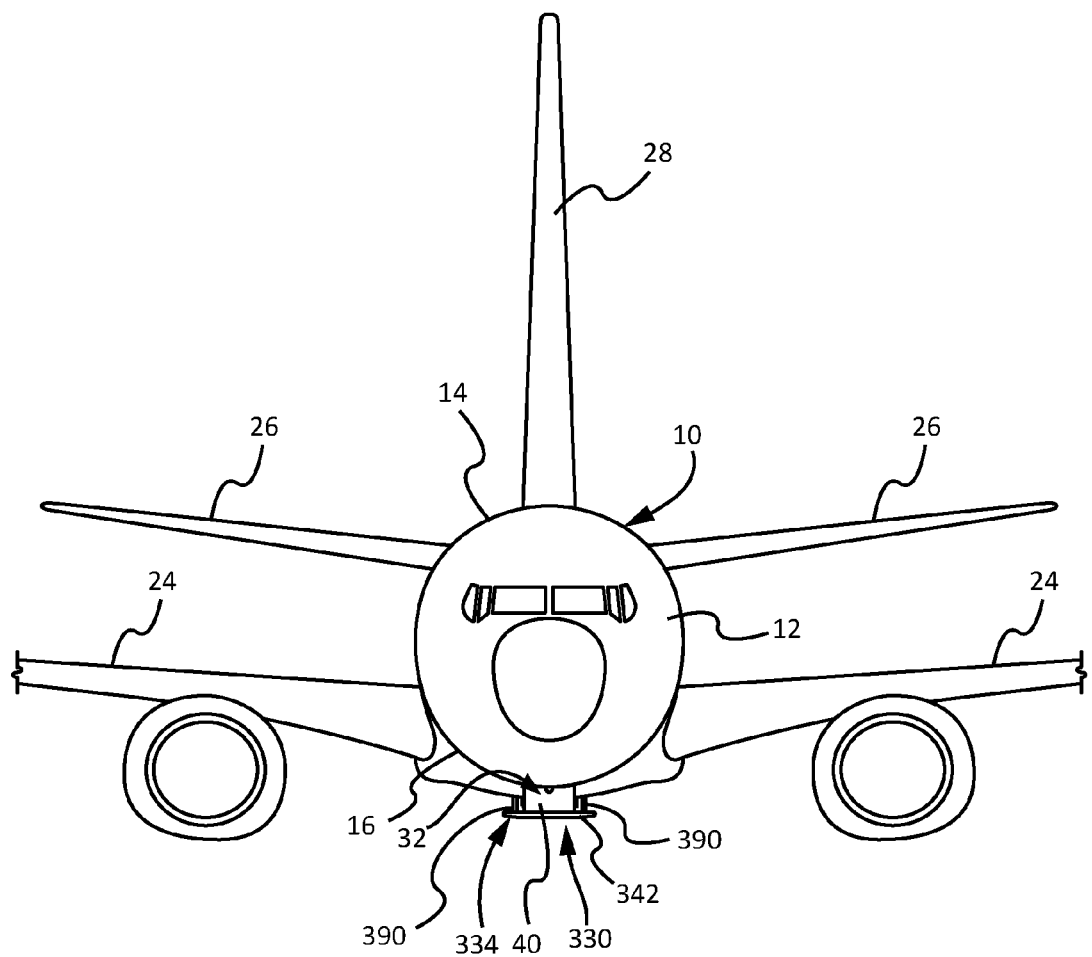
FIG. 9 is a front view of an aircraft with a modular pod system according to yet another embodiment.

Additionally, referring to FIG. 9, in certain embodiments, the external mission component may be a pair of laterally spaced-apart RF collection arrays 390 mounted on and extending from the upper surface of the board 342. In this manner, the fixed portion 40 of the pod system 330 is between the RF collection arrays 390. The internal mission components of the modular portion 334 of the pod system 330 are configured to perform functions directly related to RF collection array functionality, such as high data rate communications. The external mission components may include other types of components, such as multi-band electro-optical sensors, heat sensors, and the like, and the internal mission components may be configured to perform the function directly related to the functionality of these types of components.

Because the modular portion 34, or mission pod, may include all or the entirety of the components necessary to carry out a particular mission, including components to provide the infrastructure functionality of such mission-specific components, the modular portion is a self-contained system capable of providing the mission-specific functionality on its own without the fixed portion 32 and aircraft 10. Accordingly, when separated from the fixed portion 32, and when coupled to a power supply, the ability of the complete modular portion 34 or mission pod to perform the mission functionality in its entirety can be more accurately and comprehensively tested and determined compared to testing only a subset of the components or individual components of the entire system as is done with conventional pod systems. For example, the mission pod 34 can be removed from the fixed portion 32, which remains fixedly secured to the body 12 of the aircraft 10, and each mission component of the mission pod can be tested alone or in conjunction with any other component while the entire mission pod (including internal and external mission components) remains intact and capable of performing all mission-specific functionality.

Referring to FIGS. 4, 6, and 7, the mating interface between the fixed portion 32 and modular portion 34 promotes quick and easy attachment of the modular portion to the fixed portion and removal of the modular portion from the fixed portion. In this manner, the mating interface facilitates the ability to quickly and easily remove an entire, self-contained mission pod from an aircraft for testing or replacement without accessing the aircraft. Additionally, the mating interface promotes the ability to quickly and easily replace a mission pod with a different mission pod for a different mission, or replace a defective mission pod with an operable mission pod.

As described above, the mating interface includes a plurality of fasteners 64 inserted through aligned apertures in the side panel 40 of the fixed portion 32 and the board 42. To promote attachment and removal of the modular portion 34 without requiring access to the aircraft (e.g., the interior of the aircraft), the fixed portion 32 includes a plurality of brackets 60 formed in or coupled to the side panel 40. As shown in FIG. 4, each bracket 60 includes a fastener access space 62 above a fastener aperture 114 formed in the bracket. The fastener access space 62 is open to an exterior side of the fixed portion 32. Accordingly, the fastener access space 62 can be accessed from the exterior side of the fixed portion 32 as indicated by directional arrows 116. Further, the fastener access space 62 is large enough to allow a fastener 64 to be positioned within the space above the aligned apertures 112, 114, and large enough to allow a fastening tool, such as a screwdriver, ratchet, etc., to engage and tighten or loosen the fastener while in the access space. In certain embodiments, the brackets 60 may be covered by a respective access portion cover 78 during use (e.g., during flight). To access the brackets for installation or removal purposes, the covers 78 can be removed or moved to allow access to the brackets 60 through the access ports. The bracket 60 can have any of various other shapes. For example, the bracket 60 may be any of various L-shaped brackets.

Generally, the modular portion 34 is removably secured to the fixed portion 32 by first positioning the board 42 underneath the fixed portion such that the apertures 112 of the board are aligned with the apertures 114 of the side panel 40 (e.g., the apertures formed in the brackets 60 of the side panel). If desired, the board 42 can be positioned underneath the fixed portion 32 and raised vertically as indicated by directional arrows 110 to mate with the fixed portion. Because the board 42 can approach the fixed portion 32 from underneath, the various structures of the aircraft 10 positioned laterally of the fixed portion do not impede the installation of the modular portion 34. A plurality of fasteners 64 are then inserted into the apertures 112, 114 from an exterior side of the fixed portion 32 via a pathway indicated by directional arrows 116. The fasteners 64 are then tightened using a fastening tool to secure the upper surface 44 of the board 42 against the open end of the fixed portion 32. Because the internal mission components 50 are mounted on the upper surface 44 of the board 42, with the board secured to the side panel 40 of the fixed portion 32, the internal mission components are positioned within internal cavity 58 of the fixed portion, and effectively enclosed by the fixed portion. In some implementations, a sealing member (e.g., a gasket) can be placed between the board 42 and the side panel 40 to effectively seal the internal mission components 50 within the fixed portion 32.

The module portion 34 is removed from the fixed portion 32 by loosening each of the fasteners 64 with a fastening tool and removing the fasteners from the fastener access space 62 via the pathway indicated by arrows 116. Once the fasteners 64 are removed, the board 42 can be lowered away from the fixed portion 32 in a direction opposing the direction indicated by arrows 110. The removed board 42, including the entirely of the mission components, can be tested, repaired, and replaced if desired. Alternatively, a different modular portion with a board having identically or similar placed apertures formed in the board can be installed in the same manner as the previously removed board. In this manner, any of a plurality of modular portions or mission pods, each enabling different mission functionality, can be interchangeably secured to and removed from the fixed portion 32 without adjustment to the fixed portion or the aircraft 10.

The mission components 50 of the modular portion 34 communicate and share data with the aircraft 10 via a data communications and power link 76 formed in the fixed portion 32. Generally, the modular portion 34 includes a data communications interface that interfaces with the data communications and power link 76. In turn, a data communications interface of the aircraft 10 interfaces with the data communications and power link 76. In this manner, the data communications and power link 76 of the fixed portion 32 facilitates the transfer of data between the modular portion 34 and the aircraft 10. The data communications interfaces of the aircraft 10 and modular portion 34 of the pod system 30, and the data communications and power link 76, can include any of various interfaces, connections, lines, or other components known in the art. Further, the data communications protocol employed to transmit data between the modular portion 34, fixed portion 32, and aircraft 10 can be any of various data communication protocols, such as Transfer Control Protocol (TCP), Internet Protocol (IP), User Datagram Protocol (UDP), File Transfer Protocol (FTP), various recommended standards, and the like. As shown in FIG. 6, the data communications and power link 76 includes a connector 82 for receiving a data transmission device of the aircraft. In one implementation, the connector 82 is a coaxial cable connector and the data transmission device of the aircraft is a coaxial cable.

The data communication and power link 76 may also include an additional connector for receiving power from a power supply of the aircraft 10 via a power supply line. Power received from the aircraft 10 through the power connector of the link 76 can be used to power the infrastructure or environmental components and systems of the fixed and modular portions 32, 34, as well as to power the mission components of the modular portion. Accordingly, in some implementations, the data communication and power link 76 can include a first data output in data transmitting communication with a first data input of the aircraft, and a first power input in power receiving communication with a first power source output of the aircraft.

As shown in FIG. 6, for additional power, in some embodiments, the fixed portion 32 includes a rear tail 94 or extension with a second data communication and power link 95 that receives a second power source of the aircraft via a second power line or output from the aircraft. The second power source output can be separate from the first power source output in power providing communication with the data communication and power link 76. The second data communication and power link may have a standard interface, such as for example MIL-STD-1760, that is engageable with a corresponding interface, including power transmission components (e.g., lines), forming part of the fixed portion 32. Power from the second power source can replace or supplement the power from the first power source in powering the components of the pod system 30. Based on the configuration of the aircraft 10, the rear tail 94 facilitates access to the second data communication and power link, while providing an aerodynamic cover for the power transmission components associated with the second data communication and power link of the fixed portion 32. In addition to power, the second data communication and power link may also include a data output that is configured to transmit data (e.g., output data) to a second data input of the aircraft, which can be separate from the first data input of the aircraft. Accordingly, in some implementations, the fixed portion 32 can include a second data output in data transmitting communication with a second data input of the aircraft, and a second power input in power receiving communication with second power source output of the aircraft.

Figure 10:
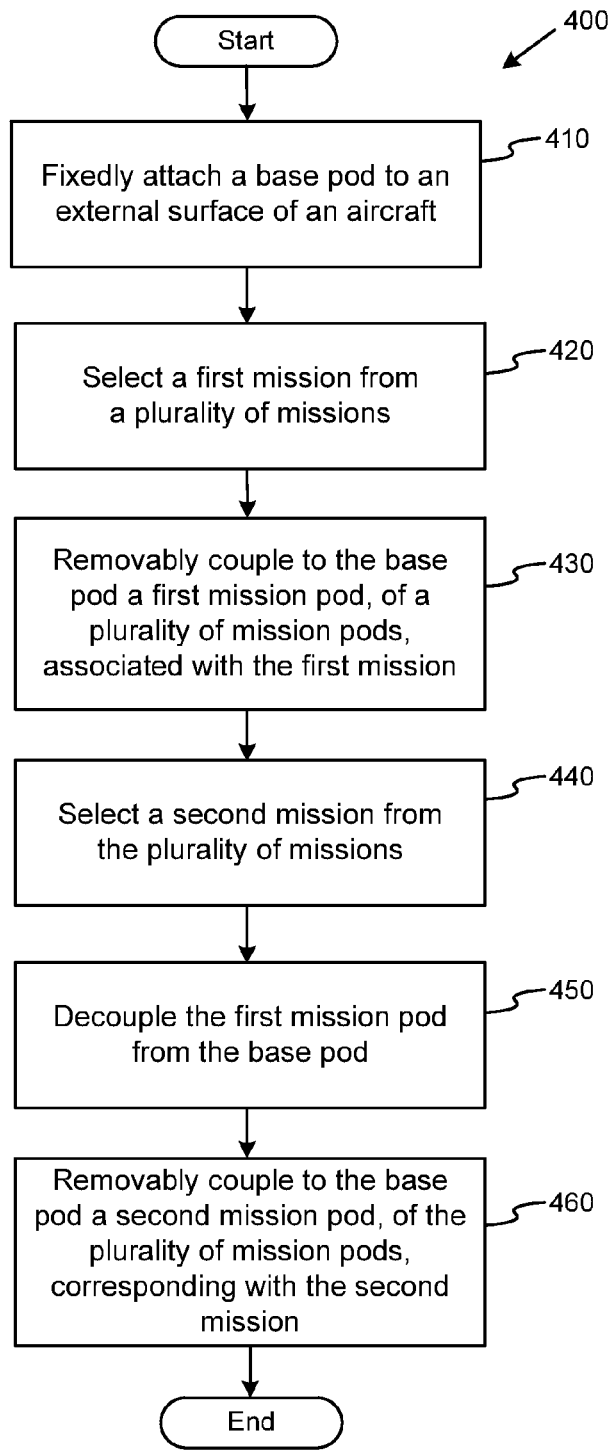
FIG. 10 is a flow chart diagram illustrating a method for fitting an aircraft for a mission according to one embodiment.

Referring to FIG. 10, according to one embodiment, a method 400 for fitting an aircraft for a mission includes fixedly attaching a base pod or fixed portion to an external surface of an aircraft at 410. The base pod of the fixed portion is mateable with a plurality of modular portions or mission pods each including mission-specific components for enabling the functionality of different missions. The method 400 includes selecting a first mission from a plurality of missions at 420. As described above, the missions may include RF collection missions, general communication missions, radar missions, optical sensing missions, video or photographic surveillance missions, high data rate communication missions, and the like. After selecting the first mission at 420, the method 400 includes removably coupling, or securing, to the base pod a first mission pod of a plurality of mission pods that corresponds with the first mission. The first mission pod includes the entirety of mission-specific components uniquely configured to enable the functionality of the first mission.

Additionally, the method 400 includes selecting a second mission from the plurality of missions at 440. In one implementation, the second mission is selected after the aircraft has sufficiently performed the first mission. The method 400 includes removing the first mission pod from the base bod at 450 and removably securing to the base pod a second mission pod of the plurality of mission pods that corresponds with the second mission. Similar to the first mission pod, the second mission pod includes the entirety of mission-specific components uniquely configured to enable the functionality of the second mission. Because the first and second missions, and the respective mission functionalities, are different, the mission-specific components of the first and second missions pods are different. Further, the removal of the first mission pod from the base pod and securing of the second mission pod to the base pod can be performed quickly and easily, which allows a single aircraft to be used for multiple missions without significant delays and complexities.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A mission pod system for an aircraft set to perform a mission, comprising:
    a fixed portion fixedly secured directly to an exterior surface of the aircraft via at least one first fastener, wherein the fixed portion comprises a sidewall defining an interior cavity with an open end; and
    a modular portion removably secured to the fixed portion and spaced away from the exterior surface of the aircraft via the fixed portion, wherein the modular portion comprises an entirety of mission-specific components;
    wherein the modular portion comprises an elongate board having a length greater than the fixed portion, a width greater than the fixed portion, and an overall height less than the fixed portion;
    wherein the elongate board is removably secured directly to the fixed portion via a plurality of second fasteners;
    wherein the elongate board is removably secured to the sidewall of the fixed portion at the open end and the elongate board covers the open end; and
    wherein the elongate board comprises an upper surface facing the aircraft and an opposing lower surface facing away from the aircraft, and wherein at least a portion of the mission-specific components are mounted on the upper surface of the elongate board, and wherein when the elongate board is removably secured to the sidewall of the fixed portion, the portion of the mission-specific components mounted on the upper surface of the elongate board are positioned within the interior cavity of the fixed portion.

2. The mission pod system of claim 1, wherein the sidewall extends substantially transversely away from the exterior surface of the aircraft, the open end extending substantially parallel to the exterior surface of the aircraft to which the fixed portion is fixedly secured.

3. The mission pod system of claim 1, wherein the portion of the entirety of components necessary for performing the mission mounted on the upper surface of the elongate board comprises computer processors for executing functionality of the mission.

4. The mission pod system of claim 1, wherein a portion of the entirety of component necessary for performing the mission is mounted on the lower surface, and wherein when the board is removably secured to the sidewall of the fixed portion, the portion of the entirety of components necessary for performing the mission mounted on the lower surface of the elongate board extends away from the interior cavity of the fixed portion.

5. The mission pod system of claim 4, wherein the portion of the entirety of components necessary for performing the mission mounted on the lower surface of the elongate board comprises at least one of blade antenna, dish antenna, phased array antenna, optical sensors, or data transceivers.

6. The mission pod system of claim 1, wherein a portion of the entirety of components necessary for performing the mission mounted on the upper surface of the elongate board is positioned external to the interior cavity of the fixed portion.

7. The mission pod system of claim 1, wherein at least a portion of the lower surface of the elongate board is transparent.

8. The mission pod system of claim 1, wherein the elongate board comprises a first data communication interface, wherein the fixed portion comprises a second data communication interface engageable with the first data communication interface to receive data from the entirety of components necessary for performing the mission, and wherein the fixed portion further comprises a third data communication interface in data receiving communication with the second data communication interface, the third data communication interface being in data providing communication with the aircraft.

9. The mission pod system of claim 1, wherein the plurality of fasteners are accessible from a location external to the aircraft.

10. The mission pod system of claim 1, wherein the upper surface is substantially flat and the lower surface is substantially flat.

11. The mission pod system of claim 1, further comprising a component cooling system positioned within the fixed portion, the component cooling system comprising an air inlet formed in the fixed portion and an air outlet formed in the fixed portion, wherein the component cooling system passively cools at least some of the entirety of mission-specific components of the modular portion.

12. The mission pod system of claim 1, further comprising a plurality of modular portions interchangeably and removably securable to the fixed portion, wherein each of the plurality of modular portions comprises an entirety of mission-specific components for a respective one of a plurality of different missions.

13. The mission pod system of claim 1, wherein the fixed portion comprises at least one of two power inputs in power receiving communication with two separate power source outputs of the aircraft, or two data outputs in data providing communication with two separate data inputs of the aircraft.

14. The mission pod system of claim 1, wherein the modular portion is removably secured to the fixed portion from below the fixed portion.

15. The mission pod system of claim 1, wherein the fixed portion comprises a top panel with a contoured surface that complements an external surface of the aircraft.

16. An aircraft, comprising:
a body defining an exterior surface;
a base pod fixedly secured directly to the exterior surface of the body via at least one first fastener, wherein the base pod comprises a sidewall defining an interior cavity with an open end; and
a mission pod removably secured to the base pod and spaced away from the exterior surface of the body via the base pod, the mission pod comprising an entirety of components specific to a mission;
wherein the mission pod comprises an elongate board having a length greater than the base pod, a width greater than the base pod, and an overall height less than the base pod;
wherein the elongate board is removably secured directly to the base pod via a plurality of second fasteners;
wherein the elongate board is removably secured to the sidewall of the base pod at the open end and the elongate board covers the open end; and
wherein the elongate board comprises an upper surface facing the body and an opposing lower surface facing away from the body, and wherein at least a portion of the components specific to the mission are mounted on the upper surface of the elongate board, and wherein when the elongate board is removably secured to the sidewall of the base pod, the portion of the components specific to the mission mounted on the upper surface of the elongate board are positioned within the interior cavity of the base pod.

17. The aircraft of claim 16, wherein the elongate board comprises substantially flat upper and lower surfaces, the elongate board being external to the body and base pod.

18. The aircraft of claim 16, wherein the body comprises external trunnions, and wherein the base pod is fixedly secured to the trunnions of the body.

19. A method for fitting an aircraft for a mission, comprising:
fixedly attaching a base pod to an external surface of the aircraft via at least one first fastener;
selecting a first mission from a plurality of missions;
removably coupling directly to the base pod via a plurality of second fasteners a first mission pod of a plurality of mission pods each associated with a different mission, the first mission pod being associated with the first mission;
selecting a second mission from the plurality of missions;
decoupling the first mission pod from the base pod by removing the plurality of second fasteners;
removably coupling directly to the base pod via the plurality of second fasteners a second mission pod of the plurality of mission pods associated with the second mission; and
passively cooling at least one of a plurality of components disposed within at least one of the first mission pod, second mission pod, and base pod via air ducts in the base pod;
wherein each of the first and second mission pods comprises an elongate board having a length greater than the fixed portion, a width greater than the fixed portion, and an overall height less than the fixed portion.

20. The method of claim 19, further comprising interchangeably coupling the first and second mission pods to the base pod, wherein the first mission pod comprises an entirety of mission-specific components for the first mission and the second mission pod comprises an entirety of mission-specific components for the second mission.

21. The method of claim 19, wherein the first mission pod is removably coupled to the base pod from below the base pod, and the second mission pod is removably coupled to the base pod from below the base pod.

* * * * *